(12) United States Patent
Sugaya (10) Patent No.: US 11,250,582 B2
(45) Date of Patent: Feb. 15, 2022

(54) IMAGE ANALYSIS DISTANCE INFORMATION PROVISION SYSTEM, METHOD, AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 29 days.

(21) Appl. No.: 16/643,283

(22) PCT Filed: Aug. 31, 2017

(86) PCT No.: PCT/JP2017/031380
§ 371 (c)(1),
(2) Date: Feb. 28, 2020

(87) PCT Pub. No.: WO2019/043878
PCT Pub. Date: Mar. 7, 2019

(65) Prior Publication Data
US 2020/0349732 A1 Nov. 5, 2020

(51) Int. Cl.
*G06T 7/50* (2017.01)
*G06T 7/62* (2017.01)
*G06T 7/70* (2017.01)

(52) U.S. Cl.
CPC .............. *G06T 7/62* (2017.01); *G06T 7/50* (2017.01); *G06T 7/70* (2017.01); *G06T 2207/10028* (2013.01); *G06T 2207/30184* (2013.01)

(58) Field of Classification Search
CPC .............. G06T 7/50; G06T 7/70; G01C 15/00
See application file for complete search history.

(56) References Cited

U.S. PATENT DOCUMENTS

| 9,317,966 | B1* | 4/2016 | Deephanphongs | ..... G06T 17/05 |
| 2002/0039445 | A1* | 4/2002 | Abe | ..... G06T 1/0007 |
| | | | | 382/199 |
| 2009/0080697 | A1* | 3/2009 | Kishikawa | ..... G01C 15/00 |
| | | | | 382/103 |

(Continued)

FOREIGN PATENT DOCUMENTS

| CN | 102422319 A | 4/2012 |
| CN | 103764448 A | 4/2014 |

(Continued)

OTHER PUBLICATIONS

Office Action dated Jun. 24, 2021 by the CIPO in the corresponding Patent Application No. 201780095577.7, with English translation.

*Primary Examiner* — Myron Wyche
(74) *Attorney, Agent, or Firm* — Norton Rose Fulbright US LLP; James R. Crawford (57) ABSTRACT

Provided is an image analysis distance information provision system, and the system includes: a computer and an imaging device. The control unit of the computer is configured to perform the following steps according to an image of an object captured by the imaging device: determining the type of the captured object; calculating the actual length of the captured object per unit length of the image of the captured object; calculating the shooting range of the image of the captured object according to the calculation result; and estimating the distance from the imaging device to the captured object according to the calculated shooting range.

5 Claims, 5 Drawing Sheets

(56) References Cited

U.S. PATENT DOCUMENTS

2011/0158475 A1 6/2011 Otani et al.
2014/0293052 A1 10/2014 Kuehnle et al.
2015/0062363 A1* 3/2015 Takenaka ........... H04N 5/23238
                                                           348/218.1

FOREIGN PATENT DOCUMENTS

| CN | 104422439 A | 3/2015 |
| JP | 6-229759 A | 8/1994 |
| JP | 10-47954 A | 2/1998 |
| JP | 2008-55943 A | 3/2008 |
| JP | 2014-182007 A | 9/2014 |
| JP | 2016-23962 A | 2/2016 |
| WO | 2014/171052 A1 | 10/2014 |

* cited by examiner

FIG. 1

Basic-information database 131 of the imaging device

| NO. | Setting position | | | Image sensor | | | Focal length | Viewing angle (angle of field of view) | | | Shooting angle | | Resolution (pixel) | |
|---|---|---|---|---|---|---|---|---|---|---|---|---|---|---|
| | Residence | Latitude | Longitude | Type | Size Horizontal | Vertical | | Horizontal | Vertical | Diagonal | Horizontal | Vertical | Horizontal | Vertical |
| 1 | OO, OO County, OO City | OO north latitude | OO east longitude | APS-C | 23.4mm | 16.7mm | 35mm | 37° | 27° | 45° | 0° | 10° | 3888 | 2592 |
| 2 | XX, OO County, OO City | XX north latitude | XX east longitude | APS-C | 23.4mm | 16.7mm | 35mm | 37° | 27° | 45° | 0° | 20° | 3888 | 2592 |
| ... | ... | ... | ... | ... | ... | ... | ... | ... | ... | ... | ... | ... | ... | ... |

FIG. 2

Object information database 132

| Building | Shape | Full length | Full width | ... |
|---|---|---|---|---|
| Building A |  | 120m | 40m | ... |
| Building B |  | 200m | 50m | ... |
| ⋮ | ⋮ | ⋮ | ⋮ | ⋮ |

Embodiment

Actual length of the building 30 per unit length (1 pixel) of the image of the building 30: 120 m/1700 pixels = 0.071 m/pixel Shooting range of the captured image:
[Vertical direction] 0.071 m/pixel x 2592 pixels = 184 m distance X between the shooting part 20 and building 30
=shooting range× focal length/vertical size of image data
=184m ×35mm/16.7mm
=386m

FIG. 5

IMAGE ANALYSIS DISTANCE INFORMATION PROVISION SYSTEM, METHOD, AND PROGRAM

This application is a national phase under 35 U.S.C. § 371 of International Application No. PCT/JP2017/031380 filed Aug. 31, 2017, which is hereby incorporated by reference in its entirety.

TECHNICAL FIELD

The present disclosure relates to an image analysis distance information provision system and method.

BACKGROUND

A technique for capturing an object and measuring the size of the captured object has been provided. (See, for example, Patent Document 1.)

Patent Document 1. Japan Patent Publication No. 2016-023962.

SUMMARY

Problem to be Solved in the Present Disclosure

However, the preceding technique is used for capturing an object and measuring the size of the captured object through image analysis, not for measuring the distance between an imaging device and the captured object. By providing a technique capable of measuring the distance between an imaging device and a captured object is capable of conveying the distance between the imaging device and, for example, a new building (if any) constructed around the setting spot of the imaging device to a person managing the imaging device.

In view of this, the present disclosure provides a technique capable of measuring the distance between an imaging device and a captured object.

Solution to the Problem

The solution provided herein is described below.

According to a first aspect of the present disclosure, provided is a image analysis distance information providing system. The system includes an object information storage unit configured to pre-store object information including shape information about the shape of an object and size information about the size of the object; an image acquisition unit configured to acquire an image of an object captured by an imaging device; a type determination unit configured to determine the type of the captured object according to the shape information; a length calculation unit configured to calculate the actual length of the captured object per unit length of the image of the captured object according to the shape information associated with the determined type of the captured object; a shooting range calculation unit configured to calculate the shooting range of the image of the captured object according to the calculation result of the length calculation unit; a distance estimation unit configured to estimate the distance from the imaging device to the captured object according to the shooting range; and a provision unit configured to provide information about the estimated distance.

According to the first aspect of the present disclosure, it can be achieved to estimate the distance from an imaging device to a captured object just by capturing the object by using the imaging device. Here, the number of imaging devices is not limited and it is feasible to provide one imaging device or a stereo type composed of multiple imaging devices. Thus, the system can be constructed freely in consideration of budget and estimation accuracy.

According to a second aspect of the present disclosure, provided is an image analysis distance information providing system based on the first aspect of the present disclosure. In the system according to the second aspect of the present disclosure, the distance estimation unit is configured to estimate the distance from the imaging device to the captured object according to the viewing angle and the magnification of the imaging device.

According to the second aspect of the present disclosure, the distance from the imaging device to the captured object is estimated according to the viewing angle and the magnification of the imaging device so that the accuracy of the estimation is further improved.

According to a third aspect of the present disclosure, provided is an image analysis distance information providing system based on the first aspect or the second aspect of the present disclosure. The system further includes a correction unit configured to correct the image of the captured object according to the shooting angle of the imaging device. In the system according to the third aspect of the present disclosure, the length calculation unit is configured to calculate, according to the shape information associated with the determined type of the captured object, the actual length of the captured object per unit length of the image of the captured object corrected by the correction unit.

According to the third aspect of the present disclosure, the image of the captured object is corrected according to the shooting angle of the imaging device so that the accuracy of the estimation of the distance from the imaging device to the captured object is further improved.

According to a fourth aspect of the present disclosure, provided is an image analysis distance information providing system based on any one of the first aspect, the second aspect or the third aspect of the present disclosure. The system further includes a position coordinate estimation unit configured to estimate the position coordinates of the captured object according to the position coordinates of the imaging device and the distance estimated by the distance estimation unit. In the system according to the fourth aspect of the present disclosure, the provision unit is configured to provide information about the distance estimated by the distance estimation unit and information about the position coordinates estimated by the position coordinate estimation unit.

According to the fourth aspect of the present disclosure, not only information about the distance estimated by the distance estimation unit but also information about the position coordinates estimated by the position coordinate estimation unit is provided. For example, not only the distance between a surveillance imaging device and a suspect but also the position coordinates of the suspect are conveyed to a monitor managing the surveillance imaging device so that the security technology is further improved.

Effect of the Present Disclosure

According to the present disclosure, provided is a technique capable of measuring the distance between an imaging device and a captured object.

BRIEF DESCRIPTION OF DRAWINGS

FIG. 2 illustrates an example of an object information database 332 of the imaging device according to an embodiment.

DETAILED DESCRIPTION

Hereinafter, embodiments for implementing the present disclosure will be described with reference to the drawings. It is to be noted that these embodiments are only examples that do not limit the scope of the present disclosure.

(Configuration of an Image Analysis Distance Information Provision System 1)

Figure 1:
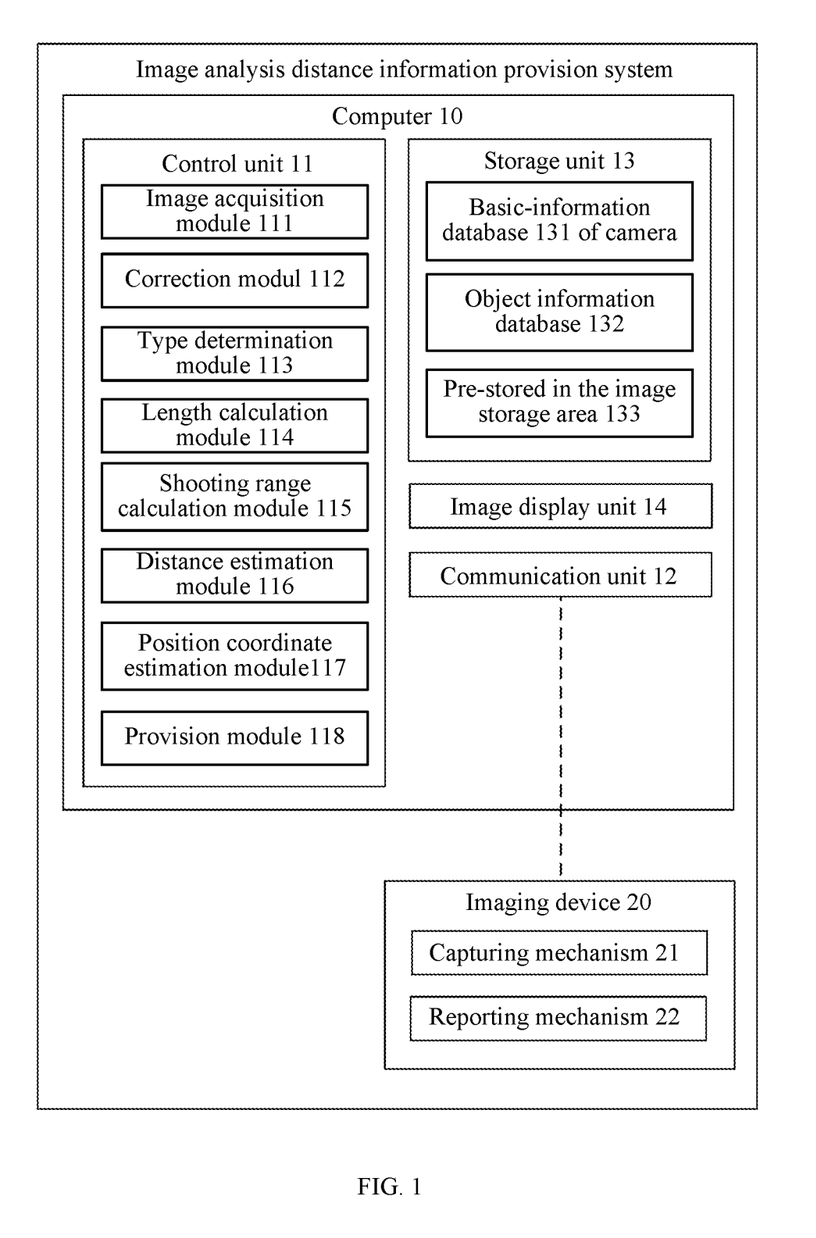
FIG. 1 is a block diagram of hardware configuration and software functions of an image analysis distance information provision system 1 according to an embodiment.

FIG. 1 is a block diagram of hardware configuration and software functions of an image analysis distance information provision system 1 according to an embodiment.

In this embodiment, the object whose image is analyzed is a building and a technique capable of measuring the distance between an imaging device and the building is described, but the object whose image is analyzed is not limited to the building. The object whose image is analyzed is not limited as long as this object is a movable corporeal thing.

Hereinafter, the image analysis distance information provision system 1 is also referred to as a system 1.

The system 1 includes a computer 10 and an imaging device 20 connected to the computer 10 via a network.

(Computer 10)

The computer 10 has the function of estimating, according to an image of an object captured by the imaging device 20, the distance from the imaging device to the captured object. The computer 10 includes a control unit 11 configured to control the actions of the computer 10; a communication unit 12 connected to the outside via the network; a storage unit 13 configured to pre-store a control program or the like executed by the microcomputer of the control unit 11; and an image display unit 14 configured to display a specified image to an administrator using the computer 10.

(Control Unit 11)

The control unit 11 includes a central processing unit (CPU), a random access memory (RAM) and a read-only memory (ROM).

Additionally, the control unit 11 is configured to read a specified program to implement an image acquisition module 111, a correction module 112, a type determination module 113, a length calculation module 114, a shooting range calculation module 115, a distance estimation module 116, a position coordinate estimation module 117 and a provision module 118.

(Communication Unit 12)

The communication unit 12 is configured to communicate with the imaging device 20 and receive a remote control signal from the imaging device 20.

(Storage Unit 13)

The storage unit 13 has devices for storing data and files and includes a hard disk, a semiconductor memory, a recording medium and a memory card.

Moreover, the storage unit 13 includes a basic-information database 131 of the imaging device 20, an object information database 132 and an image storage area 133 of the captured object.

Figure 2:
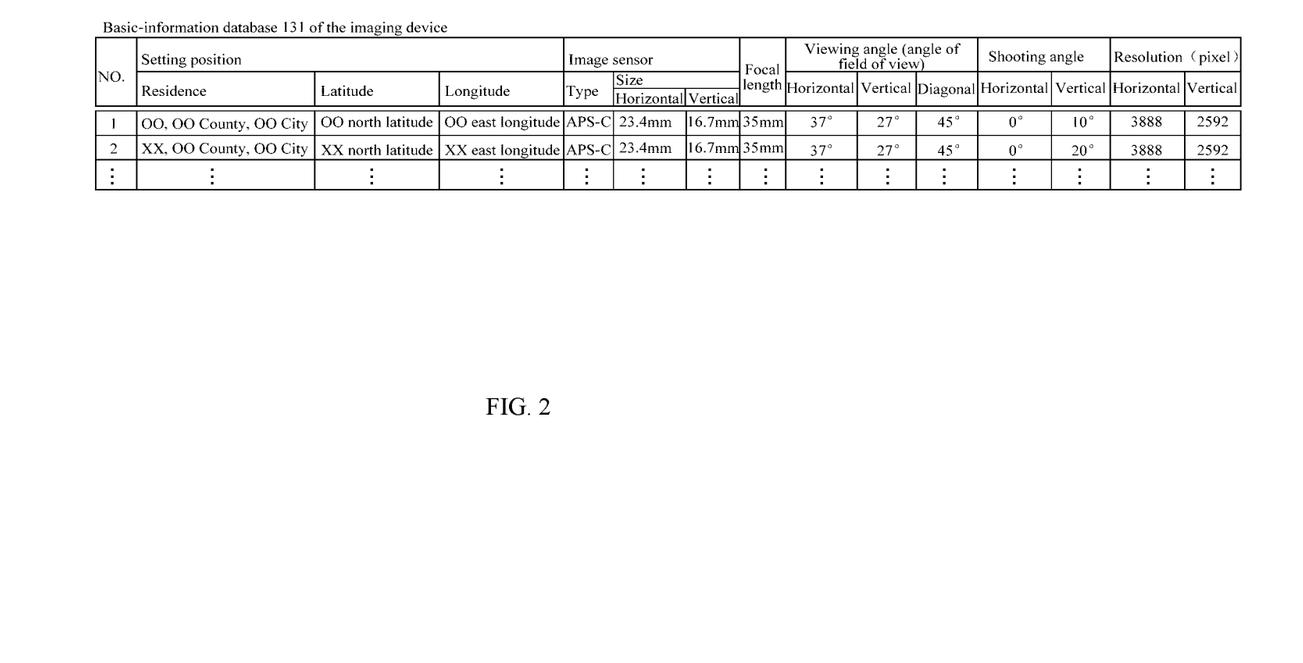
FIG. 2 illustrates an example of a basic-information database 331 of the imaging device according to an embodiment.

FIG. 2 is an example of the basic-information database 131 of the imaging device. Information about the imaging device 20 is pre-stored in the basic-information database 131. Information about the imaging device 20 includes, for example, the setting position (e.g. residence, latitude and longitude) of the imaging device 20, information about an image sensor disposed in the imaging device 20, the focal length of the imaging device 20, a viewing angle (e.g. angle of field of view), and resolution information.

In this embodiment, the magnification of the imaging device 20 is set to 1, but is not limited to 1. In the case where the magnification of the imaging device 20 is not 1, information about the magnification is also stored in the basic-information database 131 of the imaging device.

In this embodiment, information about the shooting direction of the imaging device 20 can also be stored.

Figure 3:
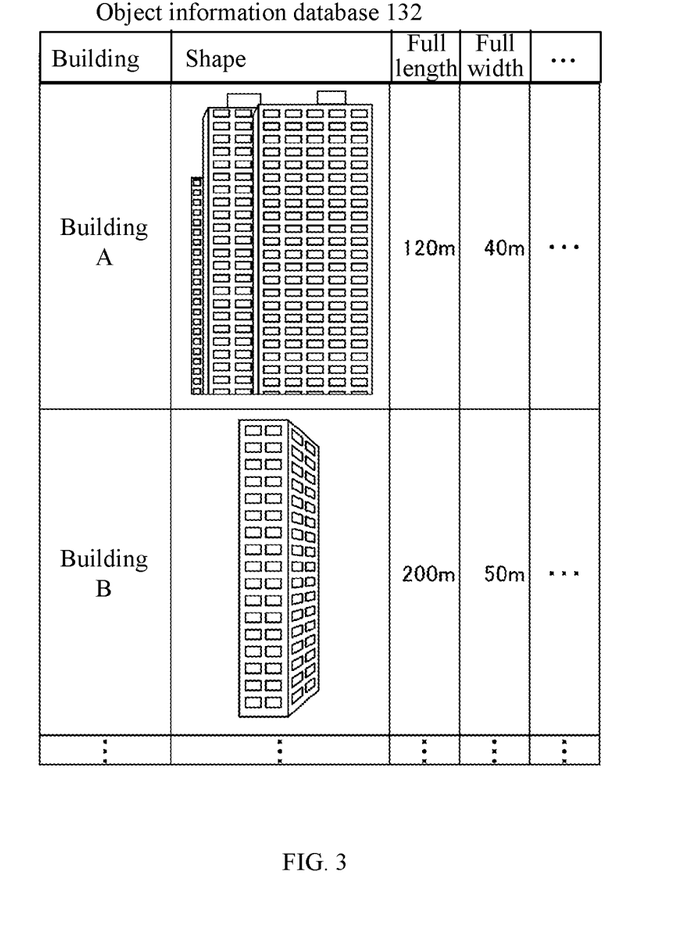

FIG. 3 is an example of the object information database 132 of the imaging device. Information about an object (e.g. a building in this embodiment) to be captured is pre-stored in the object information database 132.

Information about the building includes shape information about the shape of the building and size information about the size (e.g. full height and full width) of the building. Moreover, such information is pre-associated with object identification information for identifying the type of the building (for example, the name of the building) and is pre-stored.

The image data of the object captured by the imaging device 20 is pre-stored in the image storage area 133 of the captured image.

(Image Display Unit 14)

Returning to FIG. 1, the configuration of the image display unit 14 is not limited as long as the image display unit 14 is capable of displaying an image desired by the administrator using the computer 10.

(Imaging Device 20)

The imaging device 20 is connected to the computer 10 via the network and includes a capturing mechanism 21 and a reporting mechanism 22. The type of the imaging device 20 is not limited and may be, for example, an imaging device capable of capturing the surrounding condition from a specified building.

The configuration of the capturing mechanism 21 is not limited as long as the capturing mechanism 21 is capable of converting (or capturing) an optical image taken by a lens into an image signal by using a capturing element such as Advanced Photo System type-C (APS-C). The type of the imaging device 21 is properly selected according to the image analysis method of the captured object.

The configuration of the reporting mechanism 22 is not limited as long as the reporting mechanism 22 is capable of reporting information desired by a person around the imaging device 20. The reporting mechanism 22 may adopt a reporting scheme of auditory communication using a sound or a reporting scheme of visual communication using an image or the like.

(Flowchart of a Method for Providing Distance Information)

Figure 4:
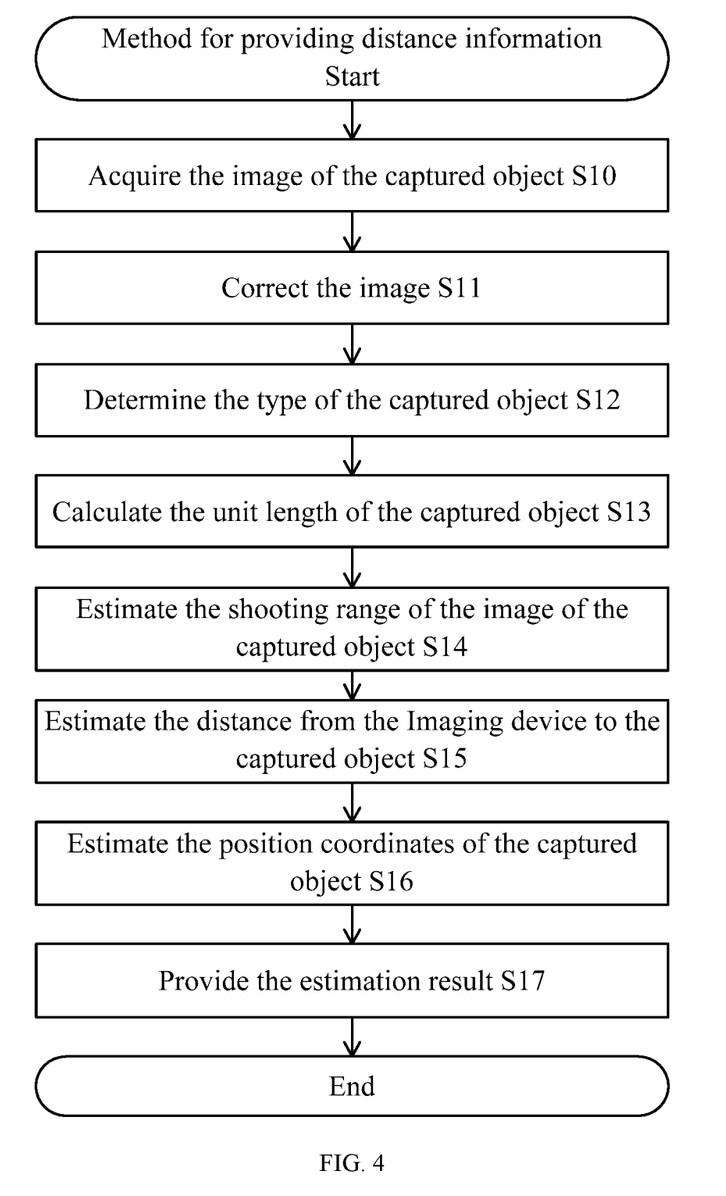
FIG. 4 is a flowchart of an image analysis distance information provision method according to an embodiment.

FIG. 4 is a flowchart of a method for providing information about the distance between the imaging device 20 and the captured object by using the system 1. The steps performed by the preceding hardware and software modules are described below.

In step S10, the image of the captured object is acquired.

First, the control unit 11 of the computer 10 of the system 1 executes the image acquisition module 111 to acquire the image of the object captured by the imaging device 20.

In step S11, the image is corrected.

Then, the control unit 11 of the computer 10 executes the correction module 112 to correct the image of the captured object according to the shooting angle of the imaging device.

The image data of the lateral surfaces, front and back of the object is stored in the object information database 132. The correction module 112 is executed to transform coordinates of the image of the object captured by the imaging device 20, thereby further improving the accuracy of the estimation of the distance from the imaging device 20 to the captured object through subsequent processing.

In step S12, the type of the captured object is determined.

Then, the control unit 11 of the computer 10 executes the type determination module 113 to determine the type of the captured object (the vehicle type of a building captured by the imaging device 20 in this embodiment) by analyzing the image (preferably an image corrected in step S11) of the captured object with reference to the image data about the shape of the object stored in the object information database 132.

Figure 5:
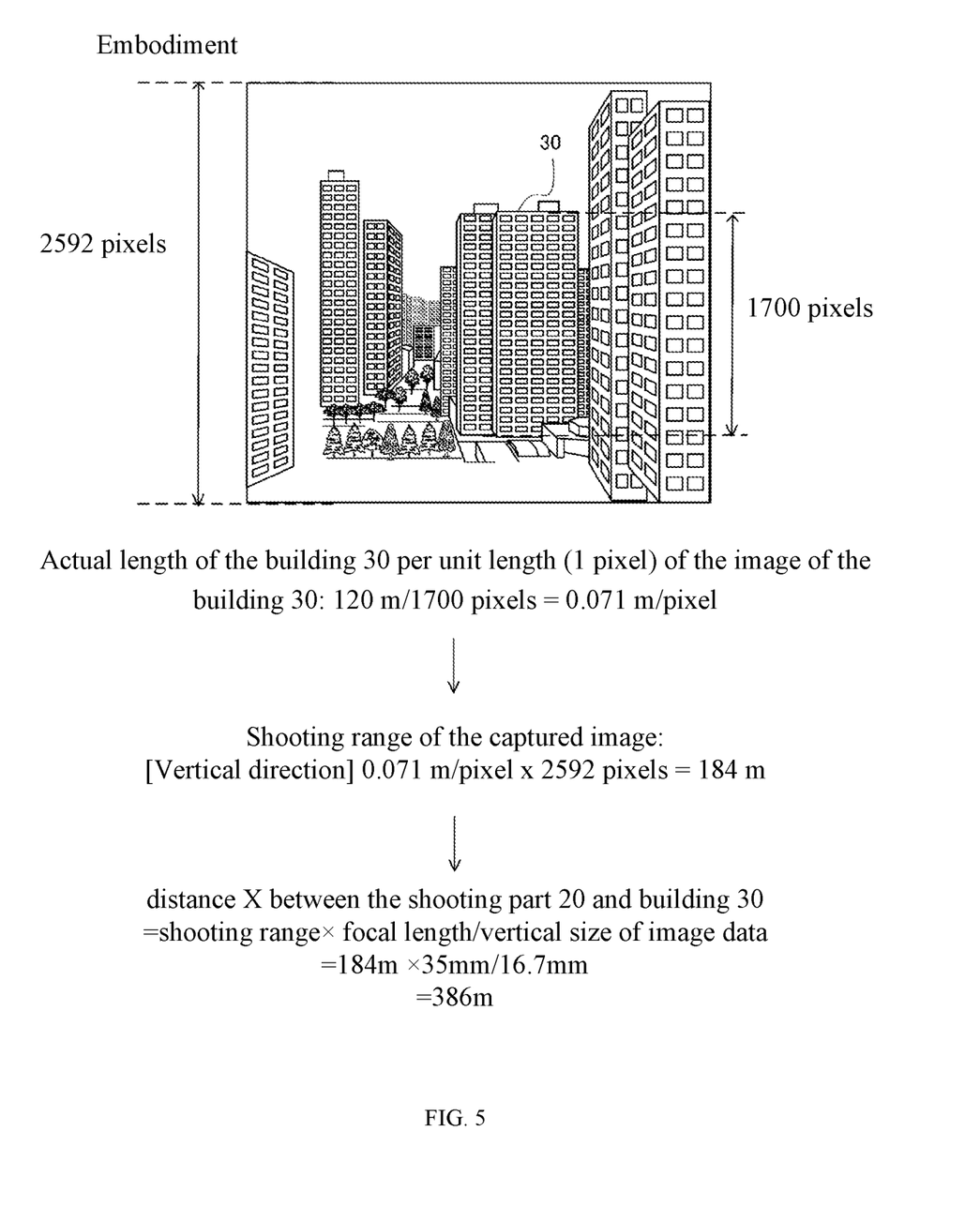
FIG. 5 illustrates an example of the actions of the image analysis distance information provision system 1 according to an embodiment.

FIG. 5 is a schematic diagram illustrating the actions of the system 1 according to this embodiment.

In this embodiment, a new building 30 that is X meter (m) away from the imaging device 20 is captured and the captured image is analyzed so that the distance between the imaging device 20 and the building 30 is estimated. Corresponding to needs, the actions of the system 1 according to this embodiment are described below with reference to FIG. 5.

The upper half of FIG. 5 is a schematic view of the image of the building 30 captured by the imaging device 20.

According to the object information database 132, the image of the captured building 30 corresponds to building A. Thus, the type of the captured object is determined as building A.

In step S13, the unit length of the captured object is calculated.

The process returns to FIG. 4. Then, the control unit 11 of the computer 10 executes the length calculation module 114. The control unit 11 makes reference to information about the size of the object stored in the object information database 132 and associated with the type of the captured object that is determined in step S12. Moreover, the control unit 11 calculates the actual length of the captured object per unit length of the image of the captured object.

In FIG. 5, the type of the captured object is determined as building A. Moreover, in the building 30 in the captured image, the length corresponding to the full height of building A is 1700 pixels. According to the object information database 132, the actual length corresponding to the full height of building A is 120 m. Thus, the actual length of the captured object per unit length (1 pixel) of the image of the captured object is estimated to be 120 m/1700 pixels=0.071 m/pixels.

In step S14, the shooting range of the image of the captured object is estimated.

The process returns to FIG. 4. Then, the control unit 11 of the computer 10 executes the shooting range calculation module 115. The control unit 11 estimates the shooting range of the image of the captured object according to the calculation result obtained in step S13.

In FIG. 5, the actual length of the captured object per unit length (that is 1 pixel) of the image of the captured object is estimated to be 120 m/1700 pixels=0.071 m/pixel. The position of the imaging device 20 is set to OO, OO County, OO City. In this case, according to the basic-information database 131 (referring to FIG. 2) of the imaging device, the resolution of the image of the captured object in the vertical direction is 2592 pixels.

Thus, the shooting range of the image of the captured object in the vertical direction is estimated to be 0.071 m/pixels×2592 pixels=184 m.

In this embodiment, the magnification of the imaging device 20 is set to 1, but is not limited to 1. When the magnification of the imaging device 20 is not 1, it is all right as long as the shooting range is properly corrected according to the magnification.

In step S15, the distance from the imaging device to the captured object is estimated.

The process returns to FIG. 4. Then, the control unit 11 of the computer 10 executes the distance estimation module 116. The control unit 11 estimates the distance from the imaging device 20 to the captured object (the building 30 shown in FIG. 5) according to the shooting range estimated in step S14.

The distance is calculated from the shooting range in the vertical direction×focal length/image data. According to step S14, the shooting range is 184 m. Additionally, according to the basic-information database 131 of the imaging device (shown in FIG. 2), the focal length of imaging device No. 1 is 35 mm and the image data of imaging device No. 1 is 16.7 mm.

Thus, the distance X from the imaging device 20 to the captured object (the building 30 in FIG. 5) is estimated to be 184 m×35 mm/16.7 mm=386 m.

(In step S16, the position coordinates of the captured object are estimated.)

The process returns to FIG. 4. Then, the control unit 11 of the computer 10 executes the position coordinate estimation module 117. The control unit 11 estimates the position coordinates of the captured object according to information about the position coordinates of the imaging device 20 stored in the basic-information database 131 of the imaging device and information about the shooting direction of the imaging device 20 stored in the basic-information database 131 of the imaging device as well as the distance estimated in step S15.

In step S17, the estimation result is provided.

Then, the control unit 11 of the computer 10 executes the provision module 118 to deliver the following instruction to the imaging device 20: to report information about the distance estimated in step S15 and information about the position coordinates estimated in step S16 to around the imaging device 20 through the reporting mechanism 22. When step S18 is ended, the system 1 ends the processing of the method for providing distance information of this embodiment.

According to this embodiment of the present disclosure, it can be achieved to estimate the distance from a imaging device 20 to a captured object just by capturing the object by using the imaging device 20. Here, the number of imaging devices 20 is not limited and it is feasible to provide one imaging device 20 or a stereo type composed of multiple imaging devices 20. Thus, the system can be constructed freely in consideration of budget and estimation accuracy.

Moreover, according to this embodiment of the present disclosure, the distance from the imaging device 20 to the captured object is estimated according to the viewing angle and the magnification of the imaging device 20 so that the accuracy of the estimation is further improved. It is to be noted that it is all right as long as parameters related to the viewing angle are known. For example, the size of the viewing angle can be known as long as the focal length and the size of the image sensor are known. Thus, the focal length and the size of the image sensor amount to parameters related to the viewing angle.

Additionally, according to this embodiment of the present disclosure, the image of the captured object is corrected according to the shooting angle of the imaging device 20 so that the accuracy of the estimation of the distance from the imaging device 20 to the captured object is further improved.

The preceding units and functions are implemented by a computer (including a CPU, an information processing device and various terminals) reading and executing a specified program. The program is provided by being recorded in a computer-readable recording medium such as a floppy disk, a compact disk (CD like CD-ROM) or a digital versatile disk (DVD like DVD-ROM or DVD-RAM). In this case, the computer reads the program from the storage medium and sends the program to an internal storage device or an external storage device so that the program is stored; then the computer executes the program. Additionally, the program may be pre-recorded in a storage device (recording medium) such as a magnetic disk, an optical disk or an optical magnetic disk, and be sent from the storage device to the computer via a communication line.

The above describes embodiments of the present disclosure, but the present disclosure is not limited to these embodiments. Additionally, the effects described in embodiments of the present disclosure are merely examples of the most suitable effects produced in the present disclosure, and the effects of the present disclosure are not limited to the effects described in embodiments of the present disclosure.

What is claimed is:

1. An image analysis distance information provision system, comprising:
    an object information storage unit, which is configured to pre-store object information comprising shape information about a shape of an object and size information about a size of the object;
    an image acquisition unit, which is configured to acquire an image of an object captured by an imaging device;
    a type determination unit, which is configured to determine a type of the captured object according to the shape information;
    a length calculation unit, which is configured to calculate an actual length of the captured object per unit length of the image of the captured object according to the shape information associated with the determined type of the captured object;
    a shooting range calculation unit, which is configured to calculate a shooting range of the image of the captured object according to a calculation result of the length calculation unit;
    a distance estimation unit, which is configured to estimate a distance from the imaging device to the captured object according to the shooting range, wherein the distance is calculated according to a formula:
    distance=the shooting range in the vertical direction× focal length/image data; and
    a provision unit, which is configured to provide information about the estimated distance;
    wherein the shape information comprises image data of lateral surfaces, front and back of the object;
    wherein the system further comprises a correction unit, which is configured to transform coordinates of the image of the object captured by the imaging device, so that the image of the captured object is corrected;
    wherein the type determination unit is configured to the type of the captured object according to the corrected image of the captured object with reference to the shape information; and
    wherein the length calculation unit is configured to calculate, according to the shape information associated with the determined type of the captured object, an actual length of the captured object per unit length of the image of the captured object corrected by the correction unit.

2. The image analysis distance information providing system according to claim 1, wherein
    the distance estimation unit is configured to estimate the distance from the imaging device to the captured object according to a viewing angle and a magnification of the imaging device.

3. The image analysis distance information providing system according to claim 1, further comprising:
    a position coordinate estimation unit, which is configured to estimate position coordinates of the captured object according to position coordinates of the imaging device and the distance estimated by the distance estimation unit,
    wherein the provision unit is configured to provide information about the distance estimated by the distance estimation unit and information about the position coordinates estimated by the position coordinate estimation unit.

4. A distance information provision method by using a system, wherein the system is configured to analyze an image captured by an imaging device and provide the distance information about a distance between the imaging device and a captured object;
    wherein the system comprises:
    an object information storage unit, which is configured to pre-store object information comprising shape information about a shape of an object and size information about a size of the object; and
    wherein the method comprises:
    acquiring the image of the object captured by the imaging device;
    determining a type of the captured object according to the shape information;
    calculating an actual length of the captured object per unit length of the image of the captured object according to the shape information associated with the determined type of the captured object;
    calculating a shooting range of the image of the captured object according to a calculation result of the actual length of the captured object per unit length of the image of the captured object;
    estimating the distance from the imaging device to the captured object according to the shooting range, wherein the distance is calculated according to a formula:
    distance=the shooting range in the vertical direction× focal length/image data; and
    providing information about the estimated distance;
    wherein the shape information comprises image data of lateral surfaces, front and back of the object;
    wherein the method further comprises a step of transforming coordinates of the image of the object captured by the imaging device, so that the image of the captured object is corrected;

wherein in the step of determining the type of the captured object, the type of the captured object is determined according to the corrected image of the captured object with reference to the shape information; and wherein in the step of calculating the actual length of the captured object, an actual length of the captured object per unit length of the image of the captured object corrected by the correction unit is calculated according to the shape information associated with the determined type of the captured object.

5. A distance information provision system, comprising: at least one processor and a memory storing processor-executable instructions, wherein when the instructions are executed by the at least one processor causes the at least one processor to perform:

acquiring an image of an object captured by an imaging device;

determining a type of the captured object according to shape information, wherein the shape information about a shape of the object and size information about a size of the object;

calculating an actual length of the captured object per unit length of the image of the captured object according to the shape information associated with the determined type of the captured object;

calculating a shooting range of the image of the captured object according to a calculation result of the actual length of the captured object per unit length of the image of the captured object;

estimating the distance from the imaging device to the captured object according to the shooting range, wherein the distance is calculated according to a formula:

distance=the shooting range in the vertical direction× focal length/image data; and providing information about the estimated distance; wherein the shape information comprises image data of lateral surfaces, front and back of the object;

wherein the prescribed steps further comprise a step of transforming coordinates of the image of the object captured by the imaging device, so that the image of the captured object is corrected;

wherein in the step of determining the type of the captured object, the type of the captured object is determined according to the corrected image of the captured object with reference to the shape information; and wherein in the step of calculating the actual length of the captured object, an actual length of the captured object per unit length of the image of the captured object corrected by the correction unit is calculated according to the shape information associated with the determined type of the captured object.

* * * * *